United States Patent [19]
Habib et al.

[11] Patent Number: 5,393,410
[45] Date of Patent: Feb. 28, 1995

[54] HYDROCARBON CONVERSION PROCESSES AND CATALYSTS USED THEREIN

[75] Inventors: Mohammad M. Habib; Arthur J. Dahlberg, both of Benicia, Calif.

[73] Assignee: Chevron Research and Technology Company, San Francisco, Calif.

[21] Appl. No.: 139,487

[22] Filed: Oct. 20, 1993

Related U.S. Application Data

[60] Division of Ser. No. 870,011, Apr. 15, 1992, abandoned, and a continuation-in-part of Ser. No. 866,917, Apr. 10, 1992, abandoned.

[51] Int. Cl.$^6$ ............................................. C10G 47/20
[52] U.S. Cl. ..................................... 208/111; 502/79
[58] Field of Search ........................... 208/111; 502/79

[56] References Cited

U.S. PATENT DOCUMENTS

| | | | |
|---|---|---|---|
| 4,550,218 | 10/1985 | Chu .................................... | 208/111 |
| 4,946,579 | 8/1990 | Occelli ................................ | 208/111 |
| 5,037,531 | 8/1991 | Bundens et al. .................... | 208/120 |

*Primary Examiner*—Anthony McFarlane
*Attorney, Agent, or Firm*—V. J. Cavalieri

[57] ABSTRACT

This invention relates to catalyst compositions useful in converting hydrocarbonaceous oils. The catalyst comprises an ultra stable Y zeolite base, wherein said Y zeolite has a unit cell size greater than about 24.55 Å and a crystal size less than about 2.8 microns, an amorphous cracking component, a binder, and a catalytic amount of hydrogenation component selected from the group consisting of a Group VI metal, a Group VIII metal, and mixtures thereof. The invention also relates to processes that are suitable for the catalyst use therein.

12 Claims, 1 Drawing Sheet

HYDROCARBON CONVERSION PROCESSES AND CATALYSTS USED THEREIN

RELATED APPLICATIONS

This is a divisional of application Ser. No. 870,011, filed Apr. 15, 1992, now abandoned. This application is also a continuation-in-part of U.S. Ser. No. 07/866,917, now abandoned, filed Apr. 10, 1992.

FIELD OF THE INVENTION

The present invention relates to catalysts and processes using the catalysts for converting hydrocarbonaceous oils to products of an average lower molecular weight and an average lower boiling point.

BACKGROUND OF THE INVENTION

Of the many hydroconversion processes known in the art, hydrocracking is becoming increasingly important since it offers product flexibility together with product quality. Because it is also possible to subject rather heavy feedstocks to hydrocracking, it will be clear that much attention has been devoted to the development of hydrocracking catalysts.

In prior disclosures it was not appreciated how to reduce or eliminate the detrimental effects polynuclear aromatics presented to hydroprocessing. Since polynuclear aromatics (PNAs) are somewhat insoluble, their accumulation results in the fouling of process equipment, such as heat exchangers and process lines, and severely impacts upon the hydrocracking catalyst performance. These PNAs also contribute to shortened catalyst life and contribute to higher hydroprocessing temperatures.

In the past, to reduce the amount of PNAs in the feed stream a recycle bleed was utilized. This reduced the PNA concentration in the feed to the hydrocracking process but the practice also resulted in products of value being removed, contributing to process inefficiencies.

Modern hydrocracking catalysts are generally based on zeolitic materials which may have been adapted by techniques like ammonium ion exchange and various forms of calcination in order to improve the performance of the hydrocracking catalysts based on such zeolites.

One of the zeolites which is considered to be a good starting material for the manufacture of hydrocracking catalysts is the well-known synthetic zeolite Y as described in U.S. Pat. No. 3,130,007 issued Apr. 21, 1964. A number of modifications have been reported for this material, one of which is ultrastable Y zeolite as described in U.S. Pat. No. 3,536,605 issued Oct. 27, 1970.

To further enhance the utility of synthetic Y zeolite and depending upon the hydroprocessing problem sought to be solved, additional components have been added by means known in the art. U.S. Pat. No. 3,835,027 issued to Ward et al. on Sep. 10, 1974, which disclosure is incorporated herein by reference, describes a catalyst containing at least one amorphous refractory oxide, a crystalline zeolitic aluminosilicate and a hydrogenation component selected from the Group VI and VIII metals and their sulfides and oxides. Ward et al. teach that the added materials enhance the catalytic and denitrogenation activity of the catalyst.

U.S. Pat. No. 3,897,327 issued to Ward on Jul. 29, 1975, the disclosure of which is incorporated herein by reference, describes a hydrocracking process using a sodium Y zeolite wherein the Y zeolite has a preliminary ammonium ion exchange to replace most of the sodium ion with ammonium ions. This product is then calcined in the presence of at least 0.2 psi of water vapor for a sufficient time to reduce the cell size to a range between 24.40 and 24.64 Å. The patent teaches that the catalyst has increased hydrothermal stability by maintaining crystallinity and surface area after calcination, exposure to water vapor or water vapor at high temperatures.

In addition to various catalyst compositions, preparation techniques have been discovered to also effect catalytic selectivity. U.S. Pat. No. 3,867,277 issued to Ward on Feb. 18, 1975, discloses the use of a Y type zeolite catalyst in a low pressure hydrocracking process. The catalyst described in the patent requires the Y zeolite to be double-exchanged and double-calcined wherein the first calcination step uses a relatively high temperature (950°–1,800° F.) and the second calcination step uses relatively low temperatures (750°–1300° F.) to yield a catalyst that is stable in ammonia environments.

U.S. Pat. No. 3,853,747 issued to Young on Dec. 10, 1974, the disclosure of which is incorporated herein by reference, teaches that hydrocracking activity of the catalyst is greater when the hydrogenating component is incorporated in the zeolite in such a manner as to avoid impregnation into the inner adsorption area of the zeolite crystallites or particles. For example, the mixing may consist of stirring, mulling, grinding, or any conventional procedure for obtaining an intimate mixture of solid material. The dispersion of the Group VIB metal hydrogenation component is achieved by adding it to the zeolite in a finely divided but essentially undissolved form. The patent teaches that in some cases the soluble molybdenum or tungsten compounds added to the zeolite by impregnation tends to destroy the zeolite crystal structure and acidity during the subsequent drying and calcination steps. Young teaches, however, that the particle size should range from 0.5 microns to 5 microns.

U.S. Pat. No. 4,857,171 issued to Hoek et al. on Aug. 15, 1989, the disclosure of which is incorporated herein by reference, teaches a process for converting hydrocarbon oils comprising contacting the oil with a catalyst consisting essentially of a Y zeolite having a unit cell size less than 24.40 Å, a silica based amorphous cracking component, a binder and at least one hydrogenation component selected from the group consisting of a Group VI metal, and/or a Group VIII metal and mixtures thereof.

European Patent Application 0,247,678 A2, which is the foreign counterpart of U.S. Pat. No. 4,857,171 issued to Hoek et al. on Aug. 15, 1989, discloses a composition of matter suitable as a catalyst in hydroprocessing comprising a crystalline aluminosilicate zeolite and a binder wherein the crystalline aluminosilicate comprises a Y zeolite having a unit cell size below 24.45 Å, a degree of crystallinity which is at least retained at increasing $SiO_2/Al_2O_3$ molar ratios, a water absorption capacity (at 25° C. and a $p/p_o$ of 0.2) of at least 8% by weight of modified zeolite and a pore volume of at least 0.25 ml/g wherein between 10% and 60% of the total pore volume is made up of pores having a diameter of at least 8 nm, an amorphous cracking component, a binder, and at least one hydrogenation component selected from the group consisting of a Group VI metal, and/or a Group VIII metal and mixtures thereof.

SUMMARY OF THE INVENTION

An embodiment of the present invention is for a process for converting hydrocarbonaceous oils into products of lower average molecular weight and lower average boiling point comprising contacting said hydrocarbonaceous oils under hydrocracking conditions with a catalyst comprising an ultra stable Y zeolite base, wherein said Y zeolite has a unit cell size greater than about 24.55 Å and a crystal size less than about 2.8 microns, an amorphous cracking component, a binder, and a catalytic amount of hydrogenation component selected from the group consisting of a Group VI metal, a Group VIII metal, and mixtures thereof.

Another embodiment of the present invention is for a catalyst composition comprising a Y zeolite having a unit cell size greater than about 24.55 Å and a crystalline cell size less than about 2.8 microns, an amorphous cracking component, a binder and at least one hydrogenation component selected from the group consisting of a Group VI metal and/or at least one hydrogenation component of a Group VIII metal, and mixtures thereof.

Among other factors, it has now been found that the presence of Y zeolites having a unit cell size greater than 24.55 Å and a crystal size of less than 2.8 microns, together with an amorphous cracking component, a binder, and at least one hydrogenation component selected from the group consisting of a Group VI metal, and/or a Group VIII metal and mixtures thereof when used in hydrocracking processes gives an unexpected high selectivity to the resulting product(s). Moreover, the catalyst when used in hydrocracking processes gives a significantly lower gas make than experienced thus far with catalysts based on Y zeolite. Also substantial amounts of polynaphthenic compounds present in the feed to be processed can be conveniently converted in the process according to the present invention.

As used herein the term polynaphthenic compounds and polynuclear aromatics are synonymous and are defined as relating to polynaphthenic compounds which, as measured by mass spectroscopy, have two or more rings in their respective structures which are predominantly condensed. Additionally, it was found that the quality of the product(s) was improved despite a lower hydrogen consumption. These improvements are even more remarkable since they can be achieved with catalysts showing a higher activity than thus far achievable with Y zeolites.

As used herein the hydrogenation component mainly means metals of Group VI and VIII in the Periodic Table, for example, chromium, molybdenum, tungsten, iron, cobalt, nickel, platinum, palladium, and the like metals and oxides and sulfides of these metals. These metals may be used in combination of two or more members. For example, combination of metals such as nickel-tungsten, cobalt-molybdenum, and the like.

The term gas make is defined as very low molecular weight products which boil at temperatures lower than those normally associated with midbarrel products, i.e., products boiling between 300° and 700° F.

It is therefor an object of the invention to provide a process for improved product octane.

Another object of the present invention is to provide a process for reducing the amount of polynuclear aromatics that accumulate in the recycle stream and deleteriously effect catalyst performance and life.

Still another object of the present invention is to provide improved liquid yields with lower gas make with decreased hydrogen consumption.

Yet another object of the present invention is to provide for an improved hydrocarbon conversion catalyst.

DESCRIPTION OF THE PREFERRED EMBODIMENTS

Figure 1:
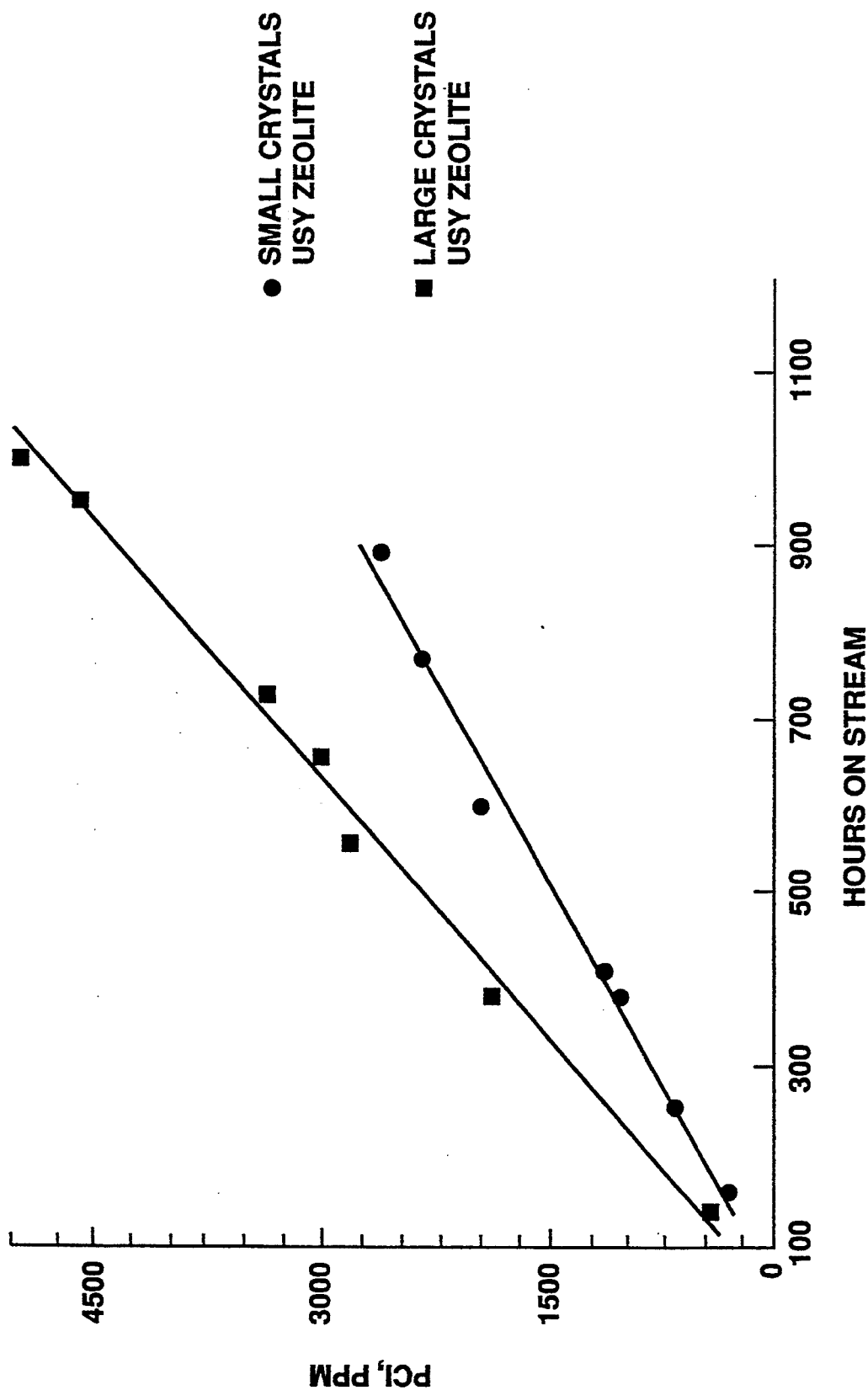
FIG. 1 is a plot illustrating how a crystal size less than about 2.8 microns of the Y zeolite reduces polynuclear aromatic concentration.

In accordance with the catalyst embodiment of the present invention, the catalyst comprises a Y zeolite having a unit cell size greater than about 24.55 Å and a crystal size less than about 2.8 microns together with an amorphous cracking component, a binder, and at least one hydrogenation component selected from the group consisting of a Group VI metal, and/or a Group VIII metal and mixtures thereof.

In preparing a Y zeolite for use in accordance with the invention herein, the process as disclosed in U.S. Pat. No. 3,808,326, the entire contents of which is incorporated herein by reference, should be followed to produce a Y zeolite having a crystal size is less than about 2.8 microns.

The catalyst compositions according to the present invention suitably comprise from about 30%–90% by weight of Y zeolite and amorphous cracking component, and from about 70%–10% by weight of binder. Preferably the catalyst compositions comprise rather high amounts of Y zeolite and amorphous cracking component, that is, from about 60%–90% by weight of Y zeolite and amorphous cracking component, and from about 40%–10% by weight of binder, and being particularly preferred from about 80%–85% by weight of Y zeolite and amorphous cracking component, and from about 20%–15% by weight of binder. Preference is given to the use of silica-alumina as the amorphous cracking component.

The amount of Y zeolite in the catalyst compositions in accordance with the present invention ranges from about 5–70% by weight of the combined amount of zeolite and cracking component. Preferably, the amount of Y zeolite in the catalyst compositions ranges from about 10%–60% by weight of the combined amount of zeolite and cracking component, and most preferablly the amount of Y zeolite in the catalyst compositions ranges from about 15–40% by weight of the combined amount of zeolite and cracking component.

Depending on the desired unit cell size the $SiO_2/Al_2O_3$ molar ratio of the Y zeolite may have to be adjusted. There are many techniques described in the art which can be applied to adjust the unit cell size accordingly. It has been found that Y zeolites having a $SiO_2/Al_2O_3$ molar ratio from about 3 to about 30 can be suitably applied as the zeolite component of the catalyst compositions according to the present invention. Preference is given to Y zeolites having a molar $SiO_2/Al_2O_3$ ratio from about 4 to about 12, and most preferably having a molar $SiO_2/Al_2O_3$ ratio from about 5 to about 8.

The amount of silica alumina in the catalyst compositions in accordance with the present invention ranges from about 10%–50% by weight, preferably from about 25%–35% by weight. The amount of silica in the silica alumina ranges from about 10%–70% by weight. Preferably, the amount of silica in the silica alumina ranges from about 20%–60% by weight, and most preferably the amount of silica in the silica alumina ranges from about 25%–50% by weight. Also so-called X-ray amorphous zeolites (i.e. zeolites having crystallite sizes too small to be detected by standard X-ray techniques) can be suitably applied as cracking components according to the process embodiment of the present invention.

The binder(s) present in the catalyst compositions suitably comprise inorganic oxides. Both amorphous and crystalline binders can be applied. Examples of suitable binders comprise silica, alumina, clays and zirconia. Preference is given to the use of alumina as binder.

The amount(s) of hydrogenation component(s) in the catalyst compositions suitably range from about 0.5% to about 10% by weight of Group VIII metal component(s) and from about 5% to about 25% by weight of Group VI metal component(s), calculated as metal(s) per 100 parts by weight of total catalyst. The hydrogenation components in the catalyst compositions may be in the oxidic and/or the sulphidic form. If a combination of at least a Group VI and a Group VIII metal component is present as (mixed) oxides, it will be subjected to a sulphiding treatment prior to proper use in hydrocracking.

Suitably, the catalyst compositions to be used in the process according to the present invention comprise one or more components of nickel and/or cobalt and one or more components of molybdenum and/or tungsten or one or more components of platinum and/or palladium.

The catalyst compositions in accordance with the present invention comprise from about 3%–10% by weight of nickel and from about 5%–20% by weight molybdenum. Preferably, the catalyst compositions in accordance with the present invention comprise from about 4%–8% by weight of nickel and from about 8%–15% by weight molybdenum, calculated as metals per 100 parts by weight of total catalyst.

The present invention also relates to catalyst compositions comprising a Y zeolite having a unit cell size greater than about 24.55Å and a crystal size less than about 2.8 microns, a binder and at least one hydrogenation component of a Group VI metal and/or at least one hydrogenation component of a Group VIII metal, and wherein about 30%–90% by weight of the catalyst is made up of Y zeolite and amorphous cracking component and from about 70%–10% by weight is made up of binder. Preference is given to catalyst compositions wherein from about 60%–90% by weight of the catalyst is made up of Y zeolite and amorphous cracking component and from about 40%–10% by weight is made up of binder. Particularly preferred are catalyst compostions wherein from about 80%–85% by weight is Y zeolite and amorphous cracking component, and from about 20%–15% by weight is binder.

It has been found that very good results in terms of performance and activity as well as conversion of unwanted polynaphthenic compounds can be obtained when Y zeolites are used in hydrocracking processes having a unit cell size greater than about 24.55Å and a crystal size less than about 2.8 microns.

The process embodiment of the present invention provides for a process for converting hydrocarbonaceous oils into products of lower average molecular weight and lower average boiling point comprising contacting said hydrocarbonaceous oils under hydrocracking conditions with a catalyst comprising an ultra stable Y zeolite base, wherein said Y zeolite has a unit cell size greater than about 24.55 Å and a crystal size less than about 2.8 microns, an amorphous cracking component, a binder, and a catalytic amount of hydrogenation component selected from the group consisting of a Group VI metal, a Group VIII metal, and mixtures thereof.

The unit cell size of the Y zeolites present in the catalyst compositions is greater than about 24.55Å (as determined by ASTM-D-3492, the zeolite being present in its $NH_4+$ form) and preferably greater than about 24.65 Å. It should be noted that the unit cell size is but one of the parameters which determine the suitability of Y zeolites. It has been found that also the water absorption capacity and the pore diameter distribution as well as the crystal size have to be taken into account in order to be able to obtain marked improvements in performance as referred to herein.

As to crystal size, it should be noted that the Y zeolites according to the present invention should have a crystal size less than about 2.8 microns. Crystal size is determined by using scanning electron microscopy. The electron microscope is calibrated in linear units, and the dimension of the particles in the electron micrographs is then compared with the calibration. This method of determining crystal size is well known in the art.

The process according to the present invention is suitably carried out by using a catalyst comprising from about 30%–90% by weight of Y zeolite and amorphous cracking component, from about 70%–10% by weight of binder. In particular, the process according to the present invention is carried out by using a catalyst comprising rather high amounts of Y zeolite, that is, from about 60%–90% by weight of Y zeolite and amorphous cracking component, and from about 40%–10% by weight of binder, and catalysts comprising from about 80%–85% by weight of Y zeolite and amorphous cracking component, and from about 20%–15% by weight of binder being particularly preferred.

Suitably, silica-based amorphous cracking components can be used in the process according to the present invention. Preference is given to the use of silicaalumina as the amorphous cracking component. The amount of silica alumina in the catalyst compositions in accordance with the process embodiment of the present invention ranges from about 10%–50% by weight, preferably from about 25%–35% by weight. The amount of silica in the silica alumina ranges from about 10%–70% by weight. Preferably, the amount of silica in the silica alumina ranges from about 20%–60% by weight, and most preferably the amount of silica in the silica alumina ranges from about 25%–50% by weight. Also so-called X-ray amorphous zeolites (i.e. zeolites having crystallite sizes too small to be detected by standard X-ray techniques) can be suitably applied as cracking components according to the process embodiment of the present invention.

Hydroconversion process configurations in accordance with the present invention are those wherein a substantial reduction in average molecular weight and boiling point can be accomplished by contacting the feed with a catalyst composition comprising a Y zeolite, an amorphous cracking component and a binder as described hereinbefore.

Examples of such processes are well known in the art and comprise single-stage hydrocracking, two-stage hydrocracking, series-flow hydrocracking as well as mild hydrocracking, hydrotreating, hydrofinishing, hydrodesulfurization, and hydrodenitrification.

Feedstocks which can be suitably applied in the process according to the present invention comprise gas oils, vacuum gas oils, deasphalted oils, long residues, catalytically cracked cycle oils, coker gas oils and other thermally cracked gas oils and syncrudes, optionally originating from tar sands, shale oils, residue upgrading processes or biomass. Combinations of various feedstocks can also be applied.

It may be desirable to subject part or all of the feedstock to one or more (hydro) treatment steps prior to its use in the hydrocarbon conversion process according to the present invention. It is often found convenient to subject the feedstock to a (partial) hydrotreatment. When rather heavy feedstocks are to be processed it will be advantageous to subject such feedstocks to a (hydro) demetallization treatment.

Suitable hydrocracking conditions to be applied comprise temperatures ranging from about 250° C. to about 500° C., pressures up to about 300 bar and space velocities from about 0.1 to about 10 kg feed per liter of catalyst per hour (kg/l h). Gas/feed :ratios range from about 100 to about 5000 Nl/kg feed (normal liters at standard temperature and pressure per kilogram) can suitably be used.

Preferably, hydrocracking conditions to be applied comprise temperatures ranging from about 300° C. to about 450° C., pressures from about 25 bar to about 200 bar and space velocities from about 0.2 to about 10 kg feed per liter of catalyst per hour (kg/l/h). Gas/feed ratios preferably range from about 250 to about 2000 are applied.

It has been found that about 10% by weight of polynaphthenic components (either already present in the starting material or accumulated therein via recycle operation) can be converted at a gross conversion level of about 40% by weight per pass. Preferably, from about 25% by weight of polynaphthenic components in the hydrocarbonaceous oils are converted to lower boiling components at a gross conversion level of about 40% by weight per pass.

FIG. 1 is a plot of run time vs. PCI. Increased PCI indicates higher concentrations of potentially unstable species in the hydrocracked hydrocarbon oils. As can be seen from this graphical representation, the process of the invention unexpectedly and significantly reduced the concentration of PNAs in the hydrocracking process.

The PCI measurement is described as follows:

Hydrocracked hydrocarbon oils may be characterized by their absorbance of ultraviolet radiation at reference wavelengths of 435 nm (nanometers) and at 385 nm using standard ultraviolet spectroscopic techniques described in ASTM D2008-85. In the PCI analysis, a specific weight of sample is weighed into a 10-ml volumetric flask and is then diluted with isooctane. The sample weight can vary from 1.0 g to less than 0.005 g, depending upon the appearance of the original sample. Absorbance measurements are then made at 435 nm and 385 nm for both the diluted sample and the blank isooctane. Provided the absorbance measurements are within the linear range of the spectrophotometer, absorbances are applied to the following equation to yield the PCI value.

$$\frac{\text{Absorbance } 385 - 0.378 \times \text{Absorbance } 435}{115.0 \times \text{Sample Conc. (g/liter)}} \times 100 = PCI$$

If any of the absorbance measurements are outside the linear range of the spectrophotometer, the sample is rediluted to a lower concentration and the analysis is repeated.

The catalysts to be used in the hydrocarbon conversion process according to the present invention, and in particular in the hydrocracking process appear to be very flexible as they are capable of producing product fractions with rather narrow boiling point ranges because of their inherent property of limited over cracking. Therefore, they can be used advantageously in various modes of operation dependent on the desired product slate.

It is thus possible to use as feed a hydrocarbon oil fraction having a boiling point range slightly above the boiling point range of the product to be obtained in the process. However, substantially higher boiling feeds can also be used conveniently to produce materials of similar product boiling point range. For instance, a vacuum gas oil appears to be an excellent feedstock to product middle distillates using the catalysts in accordance with the present invention but also naphtha can be produced in high yields. By adjusting, for instance, the operating temperature and/or the recycle cut-point (when operating in recycle mode) either middle distillate or naphtha will become the main product whilst retaining high selectivity with respect to the desired product.

The ranges and limitations provided in the instant specification and claims are those which are believed to particularly point out and distinctly claim the instant invention. It is however, understood that other ranges and limitations that perform substantially the same function in substantially the same manner to obtain the same or substantially the same result are intended to be within the scope of the instant invention as defined by the instant specification and claims.

The present invention will now be illustrated by means of the following Examples.

EXAMPLE 1

A second stage hydroprocessing catalyst, Catalyst A, was prepared in accordance with U.S. Pat. No. 3,536,606, the disclosure of which is incorporated herein by reference, having the following typical composition:

15.2 wt % ultrastable Y zeolite
10.4 wt % NiO
3.4 wt % SnO
46.5 wt % $SiO_2$
24.5 wt % $Al_2O_3$

EXAMPLE 2

Preparation of the catalyst. The catalyst of the claimed invention, Catalyst B, was prepared by the multi-step process wherein Solution "A" was prepared by dissolving 297.2 g nickel nitrate hexa hydrate [Ni($NO_3)_2 6H_2O$] in 125 cc deionized water and then adding 45 g concentrated nitric acid (70% $HNO_3$).

Solution "B" was a molybdenum solution prepared by stirring and filtering a mixture composed of 26.5 wt % concentrated aqueous $NH_4OH$, 28.9 wt % $MoO_3$, balance deionized water.

A solid mixture was prepared by mixing 164.4 grams alumina powder, 186.1 grams SiO$_2$/Al$_2$O$_3$ powder, and 475.9 grams ultra stable Y zeolite powder in a sigma-blade mixer for 5 minutes at about 150° F. mixer jacket temperature. To the solid mixture was then added 160 cc of deionized water, and the mixture mixed an additional 5 minutes. Solution A was then added to the wet solid mixture, and the mixing was continued for an additional 35 minutes.

233.5 grams of solution B were then dripped into the wet solid mixture over a 5 minute period. 35 cc deionized water were added, and the wet solid mixture was mixed for an additional 15 minutes.

The wet mixture was extruded in a 2-inch Bonnot extruder. The extrudates were dried in a preheated oven at 320° F. oven for a 1 hour. They were then heated to 950° F. at 288° F./hr in 10 com dry air, held for 1 hour at 950ÅF., and then cooled to room temperature.

The resulting catalyst had the following composition:
7.4 wt % Nickel
5.8 wt % Molybdenum
47 wt % Ultra stable Y zeolite (small crystals)
19 wt % amorphous silica/alumina powder
16 wt % alumina powder The catalyst of Example 1 and Example 2 were tested under typical hydrocracking process conditions with a feed having the following specs:

| Denitrified VGO: WOW6465 | |
|---|---|
| API Gravity | 30.7 |
| Nitrogen | 06. ppm |
| Sulfur | 40 ppm |
| Distillation, D1160, vol % | |
| St | 352 |
| 50 | 674 |
| EP | 877 |

The results of the comparative test are tabulated and appear in Table 1 below.

TABLE I

| Comparing Performance of Catalyst | | |
|---|---|---|
| | Catalyst A | Catalyst B |
| C4— Yield, WT % | 13.5 | 11.8 |
| C5+ Yield, LV % | 104.1 | 105.8 |
| Hydrogen Cons. SCF/BBL | 1130 | 1030 |
| Fouling Rate, F/DAY | 2.8 | 0.45 |
| Rate Of C5+ Yield Decline, LV %/Day | 0.25 | 0.08 |

What is claimed is:

1. A process for converting hydrocarbonaceous oils and polynaphthenic components into products of lower average molecular weight and lower average boiling point comprising contacting said hydrocarbonaceous oils and polynaphthenic components under hydrocracking conditions with a catalyst comprising an ultra stable Y zeolite base, wherein said Y zeolite has a unit cell size greater than about 24.55Å and a crystal size less than about 2.8 microns, an amorphous cracking component, a binder, and a catalytic amount of hydrogenation component selected from the group consisting of a Group VI metal, a Group VIII metal, and mixtures thereof.

2. The process according to claim 1 wherein the catalyst comprises from about 30%–90% by weight of zeolite and amorphous cracking component and from about 70–10% by weight of binder.

3. The process according to claim 2, wherein the amount of Y zeolite in the catalyst ranges from about 5% to about 70% of the combined amount of Y zeolite and amorphous cracking component.

4. The process according to claim 1, wherein said amorphous cracking component is silica-based.

5. The process according to claim 4, wherein said amorphous cracking component is silica-alumina.

6. The process according to claim 5, wherein said silica-alumina contains from about 10% to about 50% by weight silica.

7. The process according to claim 1, wherein said binder comprises an inorganic oxide.

8. The process according to claim 7, wherein said binder is selected from the group consisting of silica, alumina and clay.

9. The process according to claim 1, wherein said Y zeolite has a SiO$_2$/Al$_2$O$_3$ molar ratio from about 3 to 30.

10. The process according to claim 1 wherein said Group VIII metal hydrogenation component is selected from the group consisting of nickel, cobalt, platinum, palladium and mixtures thereof and wherein said Group VI metal hydrogenation component is selected from the group consisting of molybdenum, tungsten and mixtures thereof.

11. The process according to claim 10 wherein the hydrogenation component comprises from about 3% to about 10% by weight of nickel and from about 5% to about 20% by weight molybdenum, calculated as metals per 100 parts by weight of total catalyst.

12. A process according to claim 2, wherein from about 10% by weight of polynaphthenic components in said hydrocarbonaceous oils are converted to lower boiling components at a temperature from about 250° to about 500° C., a pressure to about 300 bar and a space velocity from about 0.1 to about 10 kg feed per liter of catalyst per hour at a gross conversion level of about 40% by weight per pass.

* * * * *